US012746949B2

(12) United States Patent
Schur et al.

(10) Patent No.: US 12,746,949 B2
(45) Date of Patent: Sep. 29, 2026

(54) PREDICTION MODULES FOR AUTONOMOUS VEHICLES

(71) Applicant: Stack AV Co., Mount Pleasant, PA (US)

(72) Inventors: Randy Schur, Pittsburgh, PA (US); Thomas Petroff, Gibsonia, PA (US); Mark Ollis, Pittsburgh, PA (US); Christopher Hazard, Irvine, CA (US)

(73) Assignee: Stack AV Co., Mount Pleasant, PA (US)

( * ) Notice: Subject to any disclaimer, the term of this patent is extended or adjusted under 35 U.S.C. 154(b) by 126 days.

(21) Appl. No.: 18/678,840

(22) Filed: May 30, 2024

(65) Prior Publication Data

US 2025/0368233 A1 Dec. 4, 2025

(51) Int. Cl.
*B60W 60/00* (2020.01)
*B60W 50/00* (2006.01)

(52) U.S. Cl.
CPC .. *B60W 60/00274* (2020.02); *B60W 50/0097* (2013.01); *B60W 2552/53* (2020.02); *B60W 2554/402* (2020.02); *B60W 2554/4045* (2020.02); *B60W 2554/4046* (2020.02); *B60W 2556/10* (2020.02); *B60W 2556/40* (2020.02)

(58) Field of Classification Search
CPC ....... B60W 60/00274; B60W 50/0097; B60W 2552/53; B60W 2554/402; B60W 2556/10
See application file for complete search history.

(56) References Cited

U.S. PATENT DOCUMENTS

2021/0094558 A1* 4/2021 Garcia ................. G08G 1/0129
2022/0126875 A1* 4/2022 Hammoud ............ B60W 30/09
2023/0139578 A1* 5/2023 Parasuram ........ B60W 50/0097 701/27
2025/0145179 A1* 5/2025 Knittel ............. B60W 30/0956

* cited by examiner

*Primary Examiner* — Toya Pettiegrew
(74) *Attorney, Agent, or Firm* — Morrison & Foerster LLP

(57) ABSTRACT

A method for controlling an autonomous vehicle based on predicted behavior of one or more actors on a road comprises receiving input data comprising sensor data from one or more sensors of the autonomous vehicle about one or more actors on a road; generating an objective prediction based on the input data comprising a probability that a first actor will execute a driving operation; identifying one or more behavioral features associated with the driving operation; generating one or more behavioral feature predictions corresponding to the one or more behavioral features; providing the objective prediction and the one or more behavioral feature predictions to a motion planner; determining one or more responsive actions of the autonomous vehicle based on at least one of the objective prediction or the one or more behavioral feature predictions; and controlling motion of the autonomous vehicle based on the one or more responsive actions.

24 Claims, 4 Drawing Sheets

PREDICTION MODULES FOR AUTONOMOUS VEHICLES

FIELD

The present disclosure relates generally to autonomous vehicles and more specifically to autonomous vehicle prediction modules for predicting behavior of other actors on a road without computing full actor trajectories.

BACKGROUND

Planning the motion of an autonomous vehicle requires information about the autonomous vehicle itself (e.g., current position, destination), the road(s) on which the autonomous vehicle is traveling, and the other actors surrounding the autonomous vehicle. In particular, predicting the future behavior of other actors surrounding the autonomous vehicle is crucial to ensuring the safety and feasibility of the autonomous vehicle's next move.

SUMMARY

As explained above, predicting future behavior of other actors on a road is an essential part of motion planning for autonomous vehicles. However, the systems and methods currently used to predict behavior of other actors on a road are computationally expensive and inefficient.

An existing technique for predicting behavior of other actors on a road involves computing one or more trajectories for each actor on the road. A trajectory is a predicted path for a given actor comprising a list of points with associated times and features (e.g., speed, acceleration). Using trajectories to predict behavior of other actors on a road can be challenging because effectively capturing uncertainty in future behavior requires calculating multiple potential trajectories for each actor. Calculating multiple trajectories for each actor can be computationally expensive and inefficient. Additionally, trajectories can be unreliable. Because trajectories are calculated based on current state information, the beginning of the trajectory is the most accurate part. The accuracy of the trajectory then decreases over time, which makes the trajectory increasingly less useful to an autonomous vehicle motion planner as time passes. Furthermore, an autonomous vehicle motion planner often uses a trajectory to calculate a set of features of an actor's future behavior rather than using the full trajectory. Computing one or more full trajectories and then further computing a set of behavioral features for each trajectory is inefficient.

Other existing approaches for predicting behavior of other actors on a road use machine learning models to generate trajectories and/or individual feature predictions. However, these models need to be trained on massive amounts of collected and labeled road data, which may not be available. Additionally, building these machine learning models can be expensive and time-consuming.

Thus, computing full actor trajectories or using machine learning models to predict behavior of other actors on a road may be computationally expensive and inefficient. Accordingly, there is a need for improved systems, methods, and techniques for predicting behavior of other actors on a road.

Described herein are systems and methods for controlling an autonomous vehicle based on predicted behavior of one or more actors on a road. Behavioral features of other actors on the road can be predicted directly without computing full trajectories for those other actors. The systems and methods described herein may address one or more of the above-identified needs.

In some embodiments, a method of controlling an autonomous vehicle based on predicted behavior of one or more actors on a road uses prediction modules to directly predict behavioral features of one or more actors without computing full actor trajectories. The method may begin with receiving input data comprising sensor data from one or more sensors of the autonomous vehicle about one or more actors on a road. Based on the input data, an objective prediction module may generate an objective prediction comprising a probability that a first actor will execute a driving operation.

An objective prediction module may be configured to predict whether a driving operation classified as an objective will be performed. As used herein, an objective refers to a specific maneuver that a vehicle or a driver thereof intends to perform. A driving operation may be classified as an objective when the driving operation requires one or more sub-operations (referred to herein as behavioral features) to be performed in order to execute the driving operation. For example, a driver may intend to change lanes. In that case, the objective is to change lanes, and one or more behavioral features are required to execute that objective (e.g., accelerating or decelerating, merging in front or another vehicle, etc.).

After an objective prediction is generated, one or more behavioral features associated with the driving operation may be identified. One or more behavioral feature prediction modules may generate one or more behavioral feature predictions corresponding to the one or more behavioral features.

Objective prediction modules and behavioral feature prediction modules may be arranged in a hierarchical manner in which one or more lower-level behavioral feature prediction modules may be conditioned on the output of one or more higher-level objective prediction modules. One or more behavioral feature prediction modules may correspond to each objective prediction module. The behavioral feature prediction modules corresponding to a given objective prediction module may be associated with sub-operations required to execute the driving operation predicted by the objective prediction module. Whether the one or more behavioral feature prediction modules corresponding to an objective prediction module are run in a given scenario may be conditioned on the output of the objective prediction module. For example, the one or more behavioral feature prediction modules corresponding to an objective prediction module may be triggered if the objective prediction module outputs an objective prediction with a probability that exceeds a predetermined threshold value, while the one or more behavioral feature prediction modules may not be triggered (or may be configured to automatically output probabilities of zero) if the probability falls below the predetermined threshold value.

After behavioral feature predictions are generated, the objective prediction and the one or more behavioral feature predictions may be provided to a motion planner. The motion planner may determine or more responsive actions of the autonomous vehicle based on at least one of the objective prediction or the one or more behavioral feature predictions. A controller may then control motion of the autonomous vehicle based on the one or more responsive actions determined by the motion planner.

The systems and methods described herein provide several technical advantages. For example, directly computing behavioral feature predictions eliminates the need for computing full actor trajectories and subsequently extracting behavioral features, which can save time, money, and computing power. Additionally, using individual prediction modules to predict behavioral features rather than using a unified machine learning model can be simpler to implement and eliminates the need for amassing immense amounts of training data. Furthermore, using a hierarchy of prediction modules in which the execution of lower-level modules may be conditioned on the output of higher-level modules can minimize computational demands on a computer and increase efficiency by obviating the need to perform unnecessary predictions. For example, if an objective prediction module determines that the objective which it predicts is very unlikely (e.g., that the probability of the objective occurring falls below a predetermined threshold value), the behavioral feature prediction modules associated with that objective may not be run (or may be configured to automatically output probabilities of zero) in order to avoid performing calculations that are unlikely to be used for motion planning.

A method for controlling an autonomous vehicle based on predicted behavior of one or more actors on a road comprises: receiving input data comprising sensor data from one or more sensors of the autonomous vehicle about one or more actors on a road; generating, at an objective prediction module, an objective prediction based on the input data comprising a probability that a first actor will execute a driving operation; identifying one or more behavioral features associated with the driving operation; generating, at one or more behavioral feature prediction modules, one or more behavioral feature predictions corresponding to the one or more behavioral features; providing the objective prediction and the one or more behavioral feature predictions to a motion planner; determining, by the motion planner, one or more responsive actions of the autonomous vehicle based on at least one of the objective prediction or the one or more behavioral feature predictions; and controlling, by a controller, motion of the autonomous vehicle based on the one or more responsive actions determined by the motion planner.

In some embodiments, generating, at one or more behavioral feature prediction modules, one or more behavioral feature predictions corresponding to the one or more behavioral features comprises: determining that the probability that the first actor will execute the driving operation exceeds a predetermined threshold; and based on the determination that the probability exceeds the predetermined threshold, generating one or more behavioral feature predictions corresponding to the one or more behavioral features. In some embodiments, generating, at one or more behavioral feature prediction modules, one or more behavioral feature predictions corresponding to the one or more behavioral features comprises: determining that the probability that the first actor will execute the driving operation is below a predetermined threshold; and based on the determination that the probability is below the predetermined threshold, generating a behavioral feature prediction comprising a probability of zero for each behavioral feature associated with the driving operation. In some embodiments, the one or more behavioral feature prediction modules are at a lower hierarchical level than the objective prediction module. In some embodiments, the method further comprises: based at least partially on at least one of the objective prediction or the one or more behavioral feature predictions, generating, at a social prediction module, a social prediction for a second actor. In some embodiments, the social prediction comprises a probability that the second actor will perform an action in response to a behavior of the first actor. In some embodiments, the social prediction module is at a lower hierarchical level than the one or more behavioral feature prediction modules. In some embodiments, the input data comprises one or more planned actions of the autonomous vehicle. In some embodiments, the input data comprises one or more past actions of the autonomous vehicle. In some embodiments, the input data comprises a map of the road, wherein the map comprises lane definitions. In some embodiments, the input data comprises classification data. In some embodiments, classification data comprises classification of one or more actors on the road as cars, trucks, bicycles, or motorcycles. In some embodiments, the input data comprises lane data. In some embodiments, lane data comprises detected lanes in which one or more actors on the road are traveling. In some embodiments, the sensor data comprises kinematic data, image data, or LiDAR point cloud data. In some embodiments, kinematic data comprises position, velocity, or acceleration information about one or more actors on the road. In some embodiments, the driving operation comprises following a lane, changing to a different lane, exiting a highway via an off-ramp, entering a highway via an on-ramp, exiting a highway to a road shoulder, or entering a highway from a road shoulder. In some embodiments, the one or more behavioral features associated with the driving operation comprise merging in a specified order, accelerating, or decelerating. In some embodiments, each behavioral feature prediction comprises a modal probability and a state probability. In some embodiments, the modal probability comprises a probability that the behavioral feature will occur. In some embodiments, the state probability comprises a probability distribution describing how the behavioral feature will occur. In some embodiments, each behavioral feature prediction module generates a different behavioral feature prediction.

A system for controlling an autonomous vehicle based on predicted behavior of one or more actors on a road comprises one or more processors and memory storing one or more programs for execution by the one or more processors, the one or more programs comprising instructions that, when executed by the one or more processors, cause the system to perform a method comprising: receiving input data comprising sensor data from one or more sensors of the autonomous vehicle about one or more actors on a road; generating, at an objective prediction module, an objective prediction based on the input data comprising a probability that a first actor will execute a driving operation; identifying one or more behavioral features associated with the driving operation; generating, at one or more behavioral feature prediction modules, one or more behavioral feature predictions corresponding to the one or more behavioral features; providing the objective prediction and the one or more behavioral feature predictions to a motion planner; determining, by the motion planner, one or more responsive actions of the autonomous vehicle based on at least one of the objective prediction or the one or more behavioral feature predictions; and controlling, by a controller, motion of the autonomous vehicle based on the one or more responsive actions determined by the motion planner.

A non-transitory computer-readable storage medium storing instructions that, when executed by one or more processors of an electronic device, cause the device to: receive input data comprising sensor data from one or more sensors of the autonomous vehicle about one or more actors on a road; generate, at an objective prediction module, an objective prediction based on the input data comprising a probability that a first actor will execute a driving operation;

identify one or more behavioral features associated with the driving operation; generate, at one or more behavioral feature prediction modules, one or more behavioral feature predictions corresponding to the one or more behavioral features; provide the objective prediction and the one or more behavioral feature predictions to a motion planner; determine, by the motion planner, one or more responsive actions of the autonomous vehicle based on at least one of the objective prediction or the one or more behavioral feature predictions; and control, by a controller, motion of the autonomous vehicle based on the one or more responsive actions determined by the motion planner.

In some embodiments, any of the features of any of the embodiments described above and/or described elsewhere herein may be combined, in whole or in part, with one another.

Additional advantages will be readily apparent to those skilled in the art from the following detailed description. The aspects and descriptions herein are to be regarded as illustrative in nature and not restrictive.

BRIEF DESCRIPTION OF THE FIGURES

A better understanding of the features and advantages of the present disclosure will be obtained by reference to the following detailed description that sets forth illustrative embodiments, in which the principles of the disclosure are utilized, and the accompanying drawings of which.

DETAILED DESCRIPTION

Figure 1:
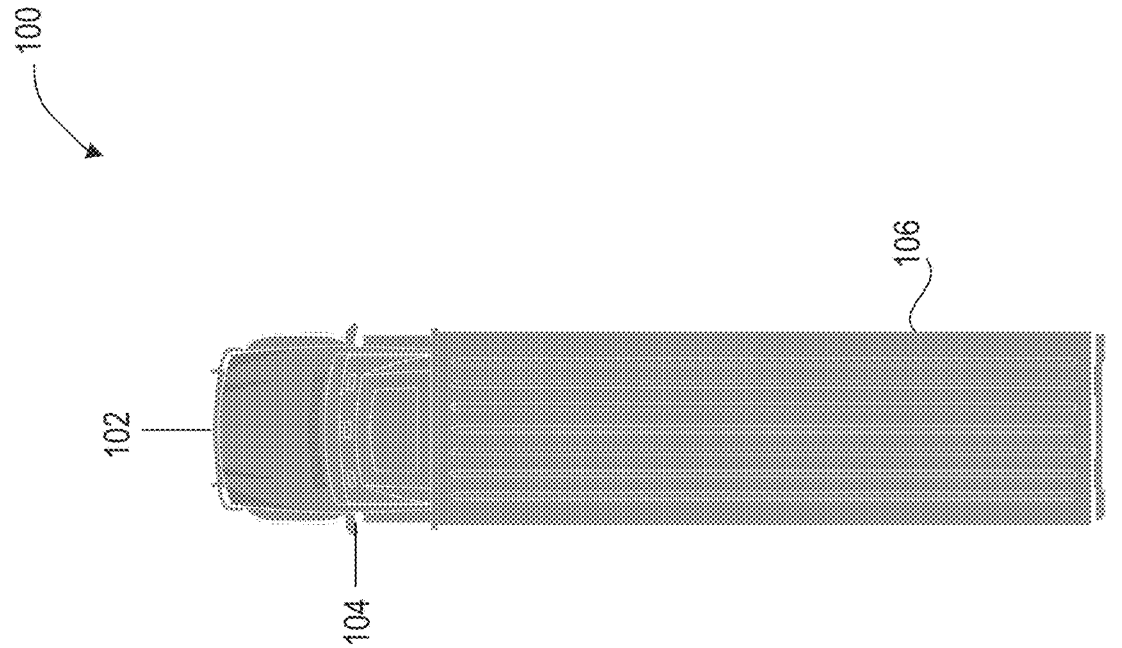
FIG. 1 illustrates an exemplary autonomous vehicle system, according to some embodiments.

As described, autonomous vehicle motion planning requires accurate predictions of the behavior of other actors on a road. Current techniques for predicting the behavior of other actors on a road are computationally inefficient and expensive.

Accordingly, provided herein are systems and methods for controlling an autonomous vehicle based on predicted behavior of one or more actors on a road. The described systems and methods can, in some embodiments, be used to control motion of an autonomous vehicle based on predicted behaviors of one or more actors on a road without computing full actor trajectories. The method may begin with receiving input data comprising sensor data from one or more sensors of the autonomous vehicle about one or more actors on a road. Based on the input data, an objective prediction module (e.g., a model configured to make a prediction with respect to one or more objectives) may generate an objective prediction comprising a probability that a first actor will execute a driving operation. One or more behavioral features associated with the driving operation may then be identified. Behavioral features are sub-operations required to perform a driving operation. One or more behavioral feature prediction modules, which sit at a lower hierarchical level than the objective prediction module, may then generate one or more behavioral feature predictions corresponding to the one or more behavioral features. The objective prediction and the one or more behavioral feature predictions may be provided to a motion planner, which may determine one or more responsive actions of the autonomous vehicle based on at least one of the objective prediction or the one or more behavioral feature predictions. A controller may then control motion of the autonomous vehicle based on the one or more responsive actions determined by the motion planner.

Reference will now be made in detail to implementations and embodiments of various aspects and variations of systems and methods described herein. Although several exemplary variations of the systems and methods are described herein, other variations of the systems and methods may include aspects of the systems and methods described herein combined in any suitable manner having combinations of all or some of the aspects described.

In the following description of the various embodiments, it is to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed terms. It is further to be understood that the terms "includes," "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Certain aspects of the present disclosure include process steps and instructions described herein in the form of an algorithm. It should be noted that the process steps and instructions of the present disclosure could be embodied in software, firmware, or hardware and, when embodied in software, could be downloaded to reside on and be operated from different platforms used by a variety of operating systems. Unless specifically stated otherwise as apparent from the following discussion, it is appreciated that, throughout the description, discussions utilizing terms such as "processing," "computing," "calculating," "determining," "displaying," "generating" or the like, refer to the action and processes of a computer system, or similar electronic computing device, that manipulates and transforms data represented as physical (electronic) quantities within the computer system memories or registers or other such information storage, transmission, or display devices.

The present disclosure in some embodiments also relates to a device for performing the operations herein. This device may be specially constructed for the required purposes, or it may comprise a general-purpose computer selectively activated or reconfigured by a computer program stored in the computer. Such a computer program may be stored in a non-transitory, storage medium, such as, but not limited to, any type of disk, including floppy disks, USB flash drives, external hard drives, optical disks, CD-ROMs, magneto-optical disks, read-only memories (ROMs), random access memories (RAMs), EPROMS, EEPROMs, magnetic or optical cards, application-specific integrated circuits (ASICs), or any type of media suitable for storing electronic instructions, and each connected to a computer system bus. Furthermore, the computing systems referred to in the specification may include a single processor or may be architectures employing multiple processor designs, such as for performing different functions or for increased computing capability. Suitable processors include central processing units (CPUs), graphical processing units (GPUs), field programmable gate arrays (FPGAs), and ASICs.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The structure for a variety of these systems will appear in the description below. In addition, the present invention is not described with reference to any particular programming language. It will be appreciated that a variety of programming languages may be used to implement the teachings of the present disclosure as described herein.

FIG. 1 illustrates an exemplary system. System 100 may include one or more sensors 102 and a computing system 104 that may be used to control the motion of a vehicle 106. Computing system 104 may be configured to receive data from one or more sensors 102 about one or more actors on a road and use the data to predict behavior of the one or more actors. Computing system 104 may further be configured to determine one or more responsive actions of vehicle 106 based on the predicted behavior and subsequently control motion of vehicle 106 based on the determined actions.

More specifically, the system 100 may detect information about one or more actors on a road using one or more sensors 102 that may be positioned on a vehicle 106 (e.g., about the exterior and/or interior of the vehicle). Sensors 102 may include one or more cameras, optical sensors, LiDAR sensors, radar sensors, or a combination thereof. Vehicle 106 may be a fully autonomous vehicle, a partially autonomous vehicle, a human-operated vehicle, or may be configured for both autonomous and human operation. The computing system 104 may receive data from sensors 102, for instance, via a communications unit (such as communications device 460 described below with reference to FIG. 4) and process the data to predict behavior of other actors on a road (e.g., using processor(s) 410 described below with reference to FIG. 4), as described in additional detail below. Computing system 104 may share any one or more characteristics with system 200 described below with reference to FIG. 2.

Figure 2:
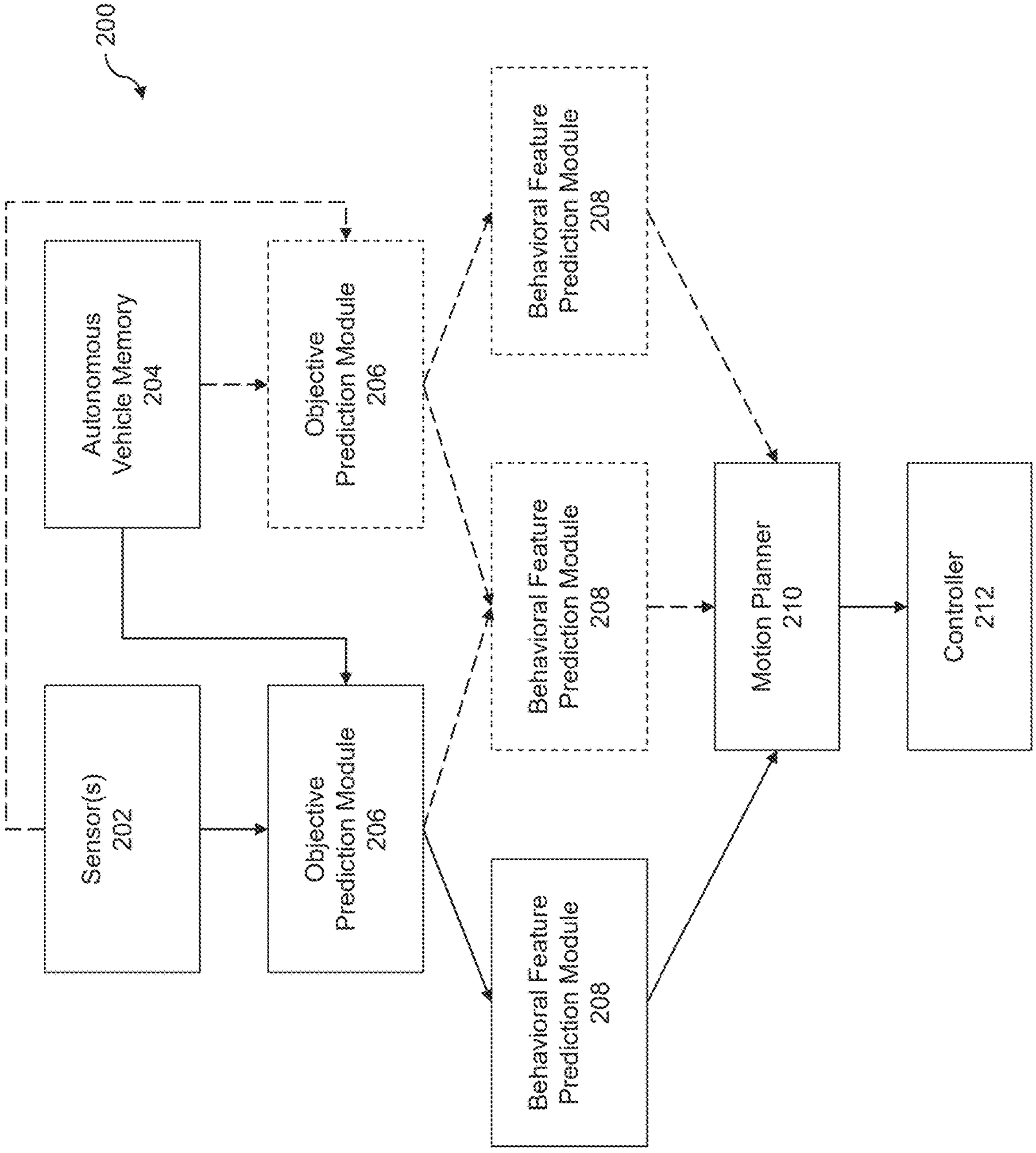
FIG. 2 illustrates an exemplary system for controlling an autonomous vehicle based on predicted behavior of one or more actors on a road, according to some embodiments.

FIG. 2 illustrates an exemplary system 200 for controlling an autonomous vehicle based on predicted behavior of one or more actors on a road, according to some embodiments. One or more components of system 200 may be part of a computing system integrated into an autonomous vehicle, such as computing system 104 of vehicle 106 described above with reference to FIG. 1. System 200 may include at least one objective prediction module 206, which may be communicatively coupled to one or more sensors 202 of an autonomous vehicle and an autonomous vehicle memory 204. Objective prediction module(s) 206 may be communicatively coupled to one or more downstream behavioral feature prediction modules 208 that sit at a lower hierarchical level than objective prediction module(s) 206. Behavioral feature prediction module(s) 208 may predict behavioral features corresponding to an objective prediction generated by objective prediction module 206. Objective prediction module(s) 206 and behavioral feature prediction module(s) 208 may be communicatively coupled to a motion planner 210. Motion planner 210 may determine one or more actions of an autonomous vehicle based on the data received from objective prediction module(s) 206 and behavioral feature prediction module(s) 208. Motion planner 210 may also be communicatively coupled to a controller 212, which may use the one or more actions determined by motion planner 210 to control the motion of the autonomous vehicle.

System 200 may include at least one objective prediction module 206. Objective prediction module(s) 206 may be communicatively coupled to one or more sensors 202 and an autonomous vehicle memory 204. Objective prediction module(s) 206 may be configured to receive data from sensors 202 and autonomous vehicle memory 204 and predict behavior of other actors on the road based on the data received. In some embodiments, all available inputs (e.g., data from sensors 202 and autonomous vehicle memory 204) may be collected as a single input struct and provided to objective prediction module(s) 206.

As used herein, "module" may refer to any one or more processors and/or one or more non-transitory computer readable storage media, wherein the media stores instructions configured to be executed by the one or more processors to cause the system to execute one or more functions (e.g., data processing operations, control operations, or the like) of the module. Modules may be separate from one another and/or may be wholly or partially overlapping with one another. For example, different modules may be implemented using the same or different sets of one or more processors, and/or using the same or different sets of storage media. Each module may have its own corresponding instructions, though instructions associated with one module may, in whole or in part, be the same as instructions associated with another module. While modules herein are shown as entirely separate from one another and from other system components, it should be appreciated that modules may, in some embodiments, overlap in whole or in part with one another, for example by sharing one or more processors in common and/or by sharing one or more storage media in common.

System 200 may comprise one or more sensors 202. Sensors 202 may share any one or more characteristics with sensors 102 described above with reference to FIG. 1. The sensors 202 may include optical sensors, cameras, LiDAR sensors, radar sensors, or a combination thereof. In some embodiments, the sensors 202 may be used to detect the surroundings of an autonomous vehicle to enable autonomous driving. Surroundings detected by the sensors 202 may include, but are not limited to, road features (e.g., lane lines or road signs), road conditions, environmental conditions, and other actors on the road. In some embodiments, the sensors 202 may be configured to measure kinematic data for other actors on the road (e.g., position, velocity, or acceleration). In some embodiments, sensors 202 may also be configured to collect images of the surroundings of the vehicle (e.g., images of lane lines, road signs, other vehicles, or obstructions in the roadway). In some embodiments, sensors 202 may also be configured to measure LiDAR point cloud data. Sensors 202 may be communicatively coupled to objective prediction module(s) 206, such that information collected by sensors 202 may be used by objective prediction module(s) 206 to predict behavior of other actors on the road.

System 200 may also comprise autonomous vehicle memory 204. Autonomous vehicle memory 204 may be any suitable device configured to provide storage, including electrical, magnetic, or optical memory. For instance, autonomous vehicle memory 204 may include random-access memory (RAM), a cache, a hard drive, a CD-ROM drive, a tape drive, or a removable storage disk. Autonomous vehicle memory 204 may include information about the autonomous vehicle itself (e.g., the current location of the autonomous vehicle, a planned route of the autonomous vehicle, one or more past actions, one or more planned future actions, or a combination thereof). In some embodiments, autonomous vehicle memory 204 may also include map data. The map data may include lane definitions for one or more roads on which the autonomous vehicle is traveling as well as the locations of intersections or exits. Autonomous vehicle memory 204 may be communicatively coupled to objective prediction module(s) 206, such that information from autonomous vehicle memory 204 may be used to predict behavior of other actors on the road.

In some embodiments, objective prediction module(s) 206 may receive data from sensors 202 and/or autonomous vehicle memory 204 and predict, based on the data, behavior of other actors on the road. In some embodiments, a prediction generated by an objective prediction module 206 may comprise an objective prediction, wherein an objective prediction comprises a probability that a given actor will execute a given driving operation. Driving operations may correspond to highway driving or surface street driving. Driving operations corresponding to highway driving may include, but are not limited to, following a lane, changing lanes, exiting a highway via an off-ramp, entering a highway via an on-ramp, exiting a highway to a road shoulder, or entering a highway from a road shoulder. Driving operations corresponding to surface street driving may include, but are not limited to, turning into a driveway, turning onto a different street, entering a traffic circle, exiting a traffic circle, following a traffic control signal, or violating a traffic control signal.

In some embodiments, objective prediction module(s) 206 may further predict behavior of non-vehicle actors on the road. For example, if the vehicle is traveling on a surface street, sensors 202 may detect pedestrians or cyclists. Based on the sensor data and/or autonomous vehicle memory 204, objective prediction module(s) 206 may generate an objective prediction comprising a probability that a given non-vehicle actor will execute a non-vehicular operation. Non-vehicular operations may include, but are not limited to, a pedestrian crossing the street, a cyclist following a lane, a cyclist switching lanes, a cyclist following a traffic control signal, or a cyclist ignoring a traffic control signal.

As shown in FIG. 2, system 200 may optionally include a plurality of objective prediction modules 206. Each objective prediction module 206 may generate a different objective prediction (e.g., a first objective prediction module may generate a probability that an actor will follow a lane, while a second objective prediction module may generate a probability that the actor will change lanes). In some embodiments, the plurality of objective prediction modules 206 may be run in parallel in order to generate a plurality of simultaneous objective predictions, all or some of which may be used for autonomous vehicle motion planning. The simultaneous objective predictions may correspond to alternative driving operations (e.g., a first objective prediction may correspond to staying in the current lane, while a second objective prediction may correspond to changing lanes) or to driving operations that can occur simultaneously (e.g., a first objective prediction may correspond to changing lanes, while a second objective prediction may correspond to exiting a highway via an off-ramp). Using a plurality of prediction modules to predict alternative driving operations may be advantageous because prediction modules designed to predict a singular driving operation may be easier to train or may use different training data than a singular module designed to predict multiple different driving operations. Thus, although alternative driving operations such as staying in a lane and changing lanes are mutually exclusive and could be predicted by a singular module, it may be desirable to use different modules to predict each driving operation.

In some embodiments, the output of an objective prediction module 206 may comprise a probability that a given actor will execute a driving operation. The output may be expressed as a POD value, a struct, or a vector of values. In some embodiments, the output may be used as an input to one or more downstream behavioral feature prediction modules 208 to generate one or more behavioral feature predictions.

System 200 may further include one or more behavioral feature prediction modules 208. Behavioral feature prediction modules 208 may sit at a lower hierarchical level than objective prediction modules 206. In some embodiments, behavioral feature prediction module(s) 208 may use the output (e.g., the probability values) from objective prediction module(s) 206 to generate behavioral feature predictions, wherein a behavioral feature prediction is a prediction that is conditioned on an objective prediction. Behavioral feature predictions may correspond to behavioral features associated with a driving operation predicted by an objective prediction module 206. Behavioral features may represent sub-operations of the driving operation. Behavioral features can include, but are not limited to, accelerating, decelerating, or merging in a specific order. For example, if a driving operation is changing lanes, associated behavioral features may include accelerating or decelerating in order to effectuate the lane change. Like driving operations, some behavioral features may correspond specifically to surface street driving and may describe behavioral features of vehicle or non-vehicle actors. For example, a behavioral feature for a non-vehicle actor on a surface street may include a pedestrian entering the road or crosswalk. In some embodiments, each behavioral feature prediction module 208 may generate a different behavioral feature prediction. For example, a first behavioral feature prediction module may generate an acceleration prediction, while a second behavioral feature prediction module may generate a deceleration prediction.

In some embodiments, a behavioral prediction may comprise a probability that a given actor will have a behavioral feature associated with a driving operation and/or a probability distribution representing the probable extent to which an actor will engage in a certain behavior (e.g., a probability distribution representing predicted acceleration, or predicted turn angle). The probability may comprise a modal probability and a state probability. A modal probability may indicate the likelihood that a given behavioral feature will occur. For instance, if a behavioral feature is acceleration, the modal probability may indicate the likelihood that an actor will accelerate. The state probability, on the other hand, may comprise a probability distribution describing the way in which a given behavioral feature will occur. Using acceleration as an example, the state probability may comprise a probability distribution indicating the respective likelihoods (e.g., as represented by discrete values and/or as a continuous curve) of various respective acceleration values. In some embodiments, a behavioral feature prediction may be expressed as a POD value, a struct, or a vector of values.

In some embodiments, whether one or more behavioral feature prediction modules 208 are run may be conditioned on the output of objective prediction module(s) 206. If the output of an objective prediction module 206 meets certain conditions precedent, the objective prediction module 206 may trigger one or more behavioral feature prediction modules 208 that sit below the objective prediction module in a hierarchical structure of modules to generate behavioral feature predictions corresponding to the objective prediction. For example, if the objective to which a behavioral feature corresponds has a probability that exceeds a predetermined threshold value, a behavioral feature module 208 corresponding to the behavioral feature may be triggered. Conversely, if the objective to which a behavioral feature corresponds has a probability that falls below the predetermined threshold value, the behavioral feature module 208 corresponding to the behavioral feature may not be triggered at all or may be configured to automatically output a probability of zero. In some embodiments, the predetermined threshold value may be selected based on training data specific to a given behavioral feature module 208. The predetermined threshold value may be about 0-50%, about 10-40%, about 20-30%, or about 25%.

In some embodiments, a plurality of behavioral feature prediction modules 208 may correspond to each objective prediction generated by a given objective prediction module 206. For example, given an objective prediction that an actor will switch lanes, a first behavioral feature prediction module may generate an acceleration prediction associated with the lane change, while a second behavioral feature prediction module may generate a deceleration prediction associated with the lane change. In some embodiments, a single behavioral feature prediction module 208 may be triggered by multiple objective predictions. For instance, an acceleration behavioral feature prediction may be generated for the objective of changing lanes as well as for the objective of staying in a current lane. If a single behavioral feature prediction module 208 is triggered by multiple objective predictions, the behavioral feature prediction module 208 may be run separately for each objective, such that the behavioral feature prediction module 208 runs separately for various different scenarios. Thus, if a behavioral feature prediction module 208 configured to generate acceleration predictions corresponds to both changing lanes and staying in a lane, separate acceleration predictions may be generated for changing lanes and staying in a lane.

In some embodiments, prediction modules of the same type (e.g., objective prediction module(s) 206 or behavioral feature prediction module(s) 208) may be run in parallel. Prediction modules that generate predictions conditioned on other predictions may run after the prediction modules on which they are conditioned run. For example, objective prediction module(s) 206 may run in parallel, and the corresponding behavioral feature prediction module(s) 208 may run in parallel after the objective prediction module(s) 206 have generated objective predictions. Thus, the hierarchical structure of prediction modules described herein may result in one or more sets of predictions comprising one or more behavioral feature predictions and one or more associated upstream objective predictions that were used as condition precedents and/or inputs for the behavioral feature predictions. Each lower-level prediction (e.g., behavioral feature prediction) may be based on one or more associated predictions from one or more upstream modules (e.g., objective predictions), where the predictions from the upstream modules are used as condition precedents and/or inputs for the downstream modules.

In some embodiments, a given set of predictions generated by objective prediction module(s) 206 and behavioral feature prediction module(s) 208 may correspond to a single actor on the road. In some embodiments, if there are multiple relevant actors on the road, objective prediction module(s) 206 and behavioral feature prediction module(s) 208 may generate predictions corresponding to each relevant actor. A relevant actor is any actor within detection range of sensors 202. In some embodiments, actors may not be relevant unless they are within a predetermined distance of the autonomous vehicle, even if they are within detection range of sensors 202. For example, if an actor is within detection range of sensors 202 but is located on the opposite side of a highway median, the actor may not be considered relevant.

In some embodiments, system 200 may include a third type of prediction module that may make predictions using the output of behavioral feature prediction module(s) 208 and/or the output of objective prediction module(s) 206. In some embodiments, the third type of prediction module may be a social prediction module that is configured to generate social predictions (e.g., predictions that account for the actual or predicted behavior of other actors). Social predictions can be generated for one actor based on the actual or predicted behavior of a second actor. For instance, if a first actor decelerates, a second actor that is behind the first actor may also decelerate in response. Similarly, if a first actor is predicted to stop at a traffic signal or a stop sign, a second actor may also be predicted to stop at the traffic signal or stop sign to avoid colliding with the first actor. In some embodiments, social predictions can also be generated for an actor based on the behavior of the autonomous vehicle. In some embodiments, the third type of prediction module may be a scene-level prediction module. A scene-level prediction module may generate a single prediction that applies to multiple actors on the road. For instance, a scene-level predictor may predict an overall merge order of multiple actors into a single lane or a large-scale slowdown or stop in a lane of travel (e.g., if a first actor ahead of a plurality of other actors slows or stops in response to a traffic incident or a traffic control signal, the plurality of other actors behind the first actor are likely to also slow or stop).

If a third type of prediction module is used, the third type of prediction module may sit at a different (lower) hierarchical level than the other prediction modules. For example, a social prediction module or a scene-level prediction module may sit at a hierarchical level below behavioral feature prediction modules 208. For a multi-level hierarchical arrangement with three or more prediction module levels, each lowest-level prediction (e.g., social or scene-level prediction) may be based on one or more associated predictions from one or more modules in each of the upstream module levels (e.g., behavioral feature predictions and objective predictions), where the predictions from the upstream module levels are used as condition precedents and/or inputs for the lowest module level.

Objective prediction module(s) 206 and behavioral feature prediction module(s) 208 (and any other types of optional prediction modules) may be communicatively coupled to a motion planner 210. Motion planner 210 may receive the predictions output by objective prediction module(s) 206, behavioral feature prediction module(s) 208, and any other type of optional prediction modules and determine one or more responsive actions of the autonomous vehicle based on at least one of the predictions. In some embodiments, all predictions (e.g., objective predictions, behavioral feature predictions, social predictions, scene level predictions) may be made available to motion planner 210. In some embodiments, this may mean that motion planner 210 receives multiple different predictions related to the same behavioral feature. For instance, motion planner 210 may receive a first acceleration prediction corresponding to a first objective prediction that an actor will change lanes as well as a second acceleration prediction corresponding to a second objective prediction that the actor will stay in the current lane.

In some embodiments, determining one or more responsive actions of the autonomous vehicle may include assigning a weight to each prediction (e.g., objective prediction or behavioral feature prediction) provided to motion planner 210. The weight assigned to a prediction may be based on a probability value associated with the prediction. In some embodiments, if the probability of a given objective or behavioral feature is below a predetermined motion planning probability requirement, motion planner 210 may assign that objective or behavioral feature a weight of zero, such that the objective or behavioral feature is not used to determine a responsive action of the autonomous vehicle. In some embodiments, the predetermined motion planning probability requirement may be selected based on training data associated with motion planner 210. In some embodiments, the predetermined motion planning probability requirement may be about 0-50%, about 10-40%, about 20-30%, or about 25%.

Motion planner 210 may be communicatively coupled to a controller 212. Controller 212 may receive the one or more responsive actions of the autonomous vehicle determined by motion planner 210 and control the motion of the autonomous vehicle based on the one or more responsive actions.

Figure 3:
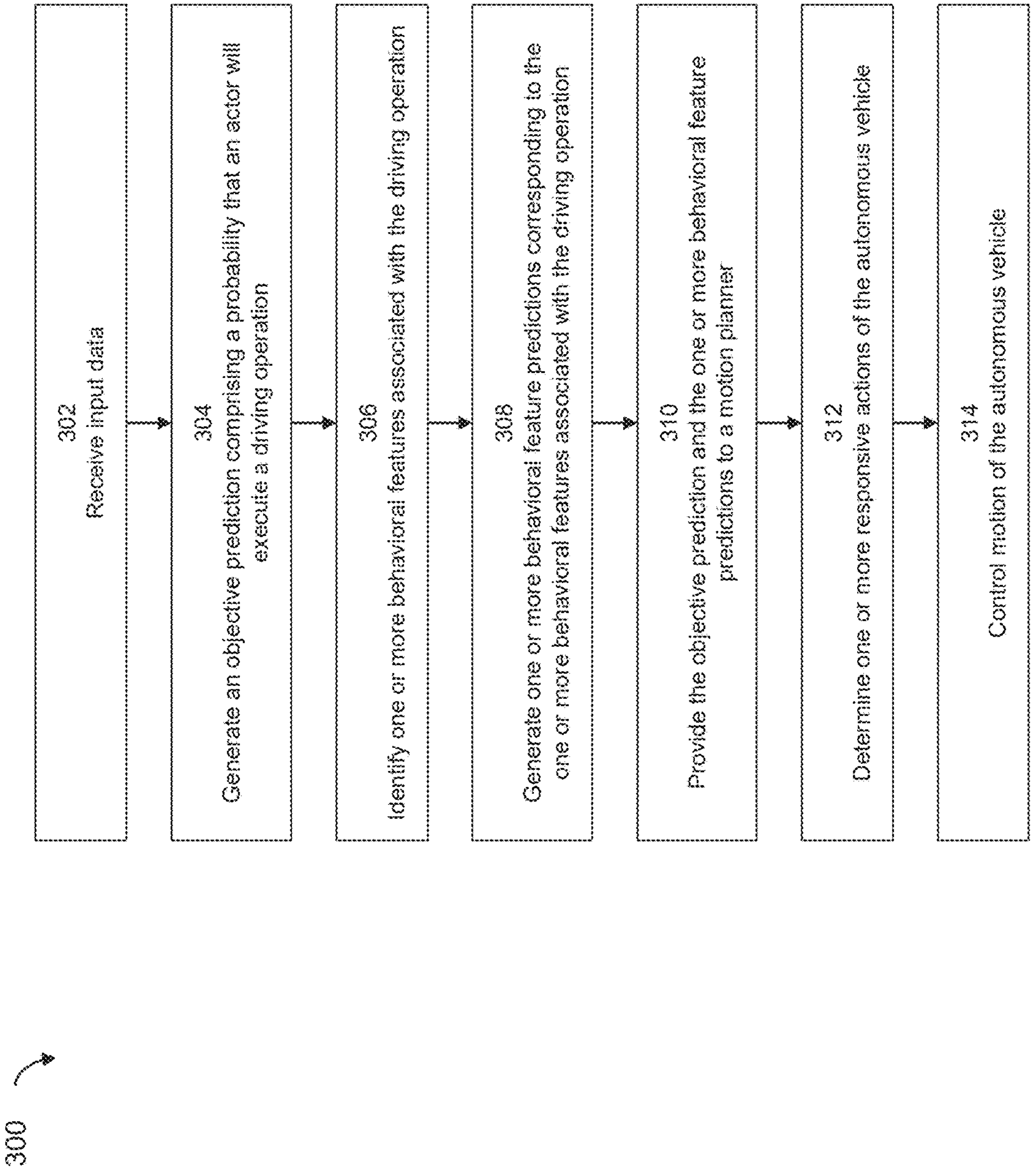
FIG. 3 illustrates an exemplary method for controlling an autonomous vehicle based on predicted behavior of one or more actors on a road, according to some embodiments.

FIG. 3 illustrates an exemplary method 300 for controlling an autonomous vehicle based on predicted behavior of one or more actors on a road, according to some embodiments. Method 300 is performed, for example, using one or more electronic devices implementing a software platform. In some embodiments, method 300 is performed using a client-server system, and the blocks of method 300 are divided up in any manner between the server and one or more client devices. Thus, while portions of method 300 are described herein as being performed by particular devices, it will be appreciated that method 300 is not so limited. In some embodiments, some steps of the method 300 are, optionally, combined; the order of some steps is, optionally, changed; and some steps are, optionally, omitted. In some embodiments, additional steps may be performed in combination with the method 300. Accordingly, the operations as illustrated (and described in greater detail below) are exemplary by nature and, as such, should not be viewed as limiting.

Step 302 comprises receiving input data. The input data can be received by one or more prediction modules of an autonomous vehicle, such as an objective prediction module 206 described above with reference to FIG. 2. In some embodiments, all input data from all sources may be represented by a single input struct that is provided to one or more prediction modules.

In some embodiments, the input data comprises sensor data from one or more sensors of the autonomous vehicle about one or more actors on a road. The one or more sensors of the autonomous vehicle may include optical sensors, cameras, LiDAR sensors, radar sensors, or a combination thereof. The one or more sensors may detect information about the current state of one or more actors on the road surrounding the autonomous vehicle. In some embodiments, the sensor data may include kinematic data (e.g., position, velocity, or acceleration information) corresponding to a given actor. Sensor data may further include image data (e.g., images of lane lines, road signs, or obstructions in the roadway) if the one or more sensors include imaging capability. Sensor data may also include LiDAR point cloud data if the one or more sensors include LiDAR sensors.

In some embodiments, input data may include information derived from sensor data. For example, sensor data may be processed to produce classification data for a given actor (e.g., whether the actor is a car, truck, motorcycle, or bicycle) and/or lane data corresponding to the actor (e.g., the lane in which the actor is currently traveling).

In some embodiments, input data may include computations based on the sensor data. For example, the distance from an actor to a road edge can be computed based on sensed lane lines and a sensed position of the actor before being provided to a prediction module. Computations represent objective facts about sensor data, as opposed to inferences or predictions extrapolated from that data, which are made by the one or more prediction modules.

In some embodiments, the input data can include additional information beyond sensor data. The additional information may be received from a memory, such as autonomous vehicle memory 204 described above with reference to FIG. 2. In some embodiments, the additional data may include ego data (e.g., data about the autonomous vehicle). The ego data can include the current position, velocity, and acceleration or deceleration of the autonomous vehicle. The ego data may include one or more planned actions of the autonomous vehicle, which may be based on a planned route of the autonomous vehicle. The ego data can also include historical data about the autonomous vehicle (e.g., one or more past predictions or recent moves made by the autonomous vehicle). The additional data received from the memory may further include a map of the road. The map may include, but is not limited to, lane definitions, intersections, exits, or a combination thereof.

After receiving input data, the method 300 can proceed to step 304. Step 304 includes generating an objective prediction comprising a probability that an actor will execute a driving operation. Step 304 may be performed by an objective prediction module, such as objective prediction module 206 described above with reference to FIG. 2. An objective prediction comprises a probability that a given actor will execute a driving operation. Driving operations may include, but are not limited to, changing lanes, staying in a current lane, entering a highway via an on-ramp, exiting a highway via an off-ramp, exiting a highway to a road shoulder (e.g., to pull over), or entering a highway from a road shoulder (e.g., after being pulled over). Other driving operations are possible. For example, additional driving operations may exist for surface streets, such as turning right or left, stopping at a stop sign, stopping at a traffic light, or stopping at a pedestrian crossing.

In step 304, an objective prediction for an actor is generated for a certain driving operation. The objective prediction may be expressed as a probability value (e.g., a fraction or a percentage indicating the likelihood that the actor will execute the driving operation). In some embodiments, multiple objective predictions for an actor may be generated simultaneously by multiple objective prediction modules. For instance, a first objective prediction module may generate an objective prediction corresponding to a first driving operation (e.g., changing lanes), while a second objective prediction module may generate an objective prediction corresponding to a second driving operation (e.g., staying in the current lane). In some embodiments, the first driving operation and the second driving operation may be alternative driving operations. In some embodiments, the first driving operation and the second driving operation may not be alternatives, and an actor may perform the first driving operation and the second driving operation simultaneously (e.g., the first driving operation may comprise changing lanes, while the second driving operation may comprise exiting the highway via an off-ramp).

After generating an objective prediction comprising a probability that an actor will execute a driving operation, the method 300 may proceed to step 306. Step 306 includes identifying one or more behavioral features associated with the driving operation.

Behavioral features may be sub-operations of a driving operation. For example, behavioral features may include accelerating, decelerating, or merging in a specific order. If multiple objective predictions were generated in step 304, one or more behavioral features may be identified corresponding to each objective prediction.

The method 300 may then proceed to step 308. Step 308 comprises generating one or more behavioral feature predictions corresponding to the one or more behavioral features associated with the driving operation. In some embodiments, a behavioral feature prediction may comprise a probability that an actor will have a given behavioral feature, wherein the probability includes a modal probability and a state probability. A modal probability may indicate the likelihood that a given behavioral feature will occur. For instance, if a behavioral feature is acceleration, the modal probability may indicate the likelihood that an actor will accelerate. The state probability, on the other hand, may comprise a probability distribution describing the way in which a given behavioral feature will occur. Using acceleration as an example, the state probability may comprise a probability distribution indicating the likelihood of various acceleration values. If multiple sets of one or more behavioral features corresponding to multiple objective predictions were identified in step 306, one or more behavioral feature predictions may be generated for each set of one or more behavioral features.

In some embodiments, generating one or more behavioral feature predictions may be conditioned on the output of the objective prediction module. If the probability that the first actor will execute the driving operation predicted by the objective prediction module exceeds a predetermined threshold, one or more behavioral feature predictions may be generated based on that determination. Conversely, if the probability that the actor will execute the driving operation predicted by the objective prediction module is below the predetermined threshold, the behavioral feature prediction modules may be configured to automatically output behavioral feature predictions comprising probabilities of zero. In some embodiments, the behavioral feature prediction modules corresponding to an objective prediction module may not run at all if the probability predicted by the objective prediction module falls below the predetermined threshold. In some embodiments, the predetermined threshold may be about 0-50%, about 10-40%, about 20-30%, or about 25%.

After generating one or more behavioral feature predictions, the method 300 may proceed to step 310, wherein step 310 comprises providing the objective predictions and the behavioral feature predictions to a motion planner. The motion planner may plan the movements of an autonomous vehicle, such as vehicle 106 described above with reference to FIG. 1.

The method 300 may then proceed to step 312. Step 312 includes determining one or more responsive actions of the autonomous vehicle. The one or more responsive actions may be determined by the motion planner. The one or more responsive actions may be based on at least one of the objective predictions and/or the behavioral feature predictions generated in steps 304 and 308, respectively. In some embodiments, steps 304-308 may be repeated for multiple actors on a road in order to generate additional objective predictions and behavioral feature predictions on which the motion planner can rely to determine the one or more responsive actions.

In some embodiments, determining one or more responsive actions of the autonomous vehicle may include assigning a weight to the objective prediction(s) and/or behavioral feature prediction(s) provided to the motion planner. The weight assigned to a prediction may be based on a probability value associated with the prediction. In some embodiments, if the probability of a given objective or behavioral feature is below a predetermined motion planning probability requirement, the motion planner may assign that objective or behavioral feature a weight of zero, such that the objective or behavioral feature is not used to determine a responsive action of the autonomous vehicle. In some embodiments, the motion planning probability requirement may be about 0-50%, about 10-40%, about 20-30%, or about 25%.

The method 300 may then proceed to step 314. Step 314 includes controlling the motion of the autonomous vehicle. The motion of the autonomous vehicle may be controlled in accordance with the one or more responsive actions determined by the motion planner in step 312. In some embodiments, a controller, such as controller 212 described above with reference to FIG. 2, is used to control the motion of the autonomous vehicle.

Figure 4:
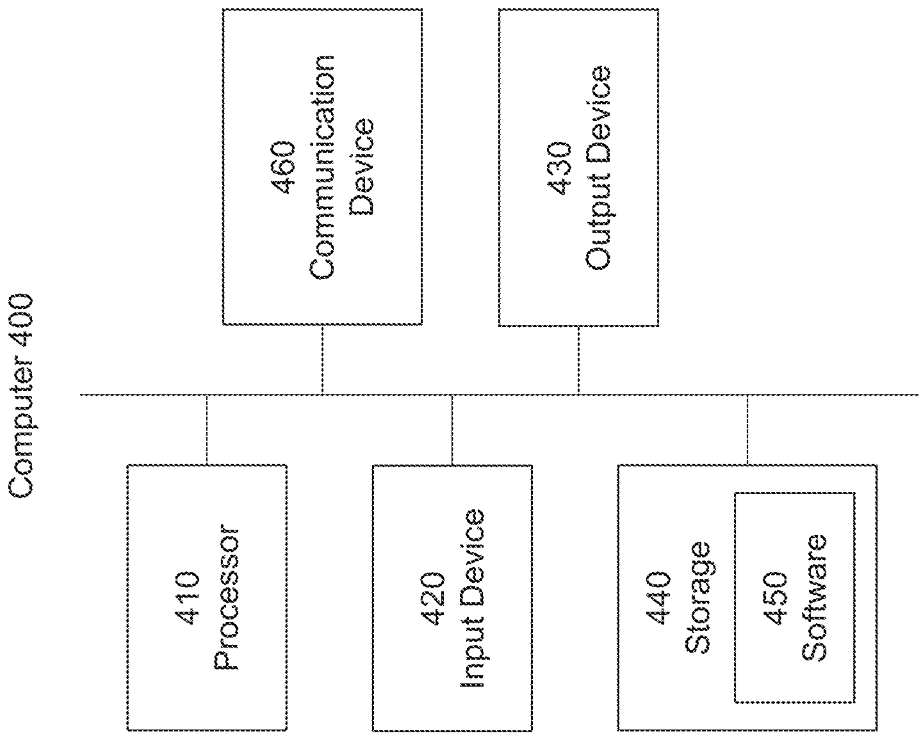
FIG. 4 illustrates an exemplary computing system, according to some embodiments.

In one or more examples, the disclosed systems and methods utilize or may include a computer system. FIG. 4 illustrates an exemplary computing system according to one or more examples of the disclosure. Computer 400 can be a host computer connected to a network. Computer 400 can be a client computer or a server. As shown in FIG. 4, computer 400 can be any suitable type of microprocessor-based device, such as a personal computer, workstation, server, or handheld computing device, such as a phone or tablet. The computer can include, for example, one or more of processor 410, input device 420, output device 430, storage 440, and communication device 460. Input device 420 and output device 430 can correspond to those described above and can either be connectable or integrated with the computer.

Input device 420 can be any suitable device that provides input, such as a touch screen or monitor, keyboard, mouse, or voice-recognition device. Output device 430 can be any suitable device that provides an output, such as a touch screen, monitor, printer, disk drive, or speaker.

Storage 440 can be any suitable device that provides storage, such as an electrical, magnetic, or optical memory, including a random-access memory (RAM), cache, hard drive, CD-ROM drive, tape drive, or removable storage disk. Communication device 460 can include any suitable device capable of transmitting and receiving signals over a network, such as a network interface chip or card. The components of the computer can be connected in any suitable manner, such as via a physical bus or wirelessly. Storage 440 can be a non-transitory computer-readable storage medium comprising one or more programs, which, when executed by one or more processors, such as processor 410, cause the one or more processors to execute methods described herein.

Software 450, which can be stored in storage 440 and executed by processor 410, can include, for example, the programming that embodies the functionality of the present disclosure (e.g., as embodied in the systems, computers, servers, and/or devices as described above). In one or more examples, software 450 can include a combination of servers such as application servers and database servers.

Software 450 can also be stored and/or transported within any computer-readable storage medium for use by or in connection with an instruction execution system, apparatus, or device, such as those detailed above, that can fetch and execute instructions associated with the software from the instruction execution system, apparatus, or device. In the context of this disclosure, a computer-readable storage medium can be any medium, such as storage 440, that can contain or store programming for use by or in connection with an instruction execution system, apparatus, or device.

Software 450 can also be propagated within any transport medium for use by or in connection with an instruction execution system, apparatus, or device, such as those described above, that can fetch and execute instructions associated with the software from the instruction execution system, apparatus, or device. In the context of this disclosure, a transport medium can be any medium that can communicate, propagate, or transport programming for use by or in connection with an instruction execution system, apparatus, or device. The transport-readable medium can include but is not limited to, an electronic, magnetic, optical, electromagnetic, or infrared wired or wireless propagation medium.

Computer 400 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Computer 400 can implement any operating system suitable for operating on the network. Software 450 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description, for the purpose of explanation, has been described with reference to specific embodiments and/or examples. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

The invention claimed is:

1. A method for controlling an autonomous vehicle based on predicted behavior of one or more actors on a road, the method comprising:

receiving input data comprising sensor data from one or more sensors of the autonomous vehicle about one or more actors on a road;

generating, at an objective prediction module, an objective prediction based on the input data comprising a probability that a first actor will execute a driving operation;

providing the objective prediction to a motion planner;

identifying one or more behavioral features associated with the driving operation;

generating, at one or more behavioral feature prediction modules, one or more behavioral feature predictions corresponding to the one or more behavioral features;

providing the one or more behavioral feature predictions to a motion planner;

determining, by the motion planner, one or more responsive actions of the autonomous vehicle based on at least one of the objective prediction or the one or more behavioral feature predictions; and controlling, by a controller, motion of the autonomous vehicle based on the one or more responsive actions determined by the motion planner.

2. The method of claim 1, wherein generating, at one or more behavioral feature prediction modules, one or more behavioral feature predictions corresponding to the one or more behavioral features comprises:

determining that the probability that the first actor will execute the driving operation exceeds a predetermined threshold; and based on the determination that the probability exceeds the predetermined threshold, generating one or more behavioral feature predictions corresponding to the one or more behavioral features.

3. The method of claim 1, wherein generating, at one or more behavioral feature prediction modules, one or more behavioral feature predictions corresponding to the one or more behavioral features comprises:

determining that the probability that the first actor will execute the driving operation is below a predetermined threshold; and based on the determination that the probability is below the predetermined threshold, generating a behavioral feature prediction comprising a probability of zero for each behavioral feature associated with the driving operation.

4. The method of claim 1, wherein the one or more behavioral feature prediction modules are at a lower hierarchical level than the objective prediction module.

5. The method of claim 1, further comprising:

based at least partially on at least one of the objective prediction or the one or more behavioral feature predictions, generating, at a social prediction module, a social prediction for a second actor.

6. The method of claim 5, wherein the social prediction comprises a probability that the second actor will perform an action in response to a behavior of the first actor.

7. The method of claim 5, wherein the social prediction module is at a lower hierarchical level than the one or more behavioral feature prediction modules.

8. The method of claim 1, wherein the input data comprises one or more planned actions of the autonomous vehicle.

9. The method of claim 1, wherein the input data comprises one or more past actions of the autonomous vehicle.

10. The method of claim 1, wherein the input data comprises a map of the road, wherein the map comprises lane definitions.

11. The method of claim 1, wherein the input data comprises classification data.

12. The method of claim 11, wherein classification data comprises classification of one or more actors on the road as cars, trucks, bicycles, or motorcycles.

13. The method of claim 1, wherein the input data comprises lane data.

14. The method of claim 13, wherein lane data comprises detected lanes in which one or more actors on the road are traveling.

15. The method of claim 1, wherein the sensor data comprises kinematic data, image data, or LiDAR point cloud data.

16. The method of claim 15, wherein kinematic data comprises position, velocity, or acceleration information about one or more actors on the road.

17. The method of claim 1, wherein the driving operation comprises following a lane, changing to a different lane, exiting a highway via an off-ramp, entering a highway via an on-ramp, exiting a highway to a road shoulder, or entering a highway from a road shoulder.

18. The method of claim 1, wherein the one or more behavioral features associated with the driving operation comprise merging in a specified order, accelerating, or decelerating.

19. The method of claim 1, wherein each behavioral feature prediction comprises a modal probability and a state probability.

20. The method of claim 19, wherein the modal probability comprises a probability that the behavioral feature will occur.

21. The method of claim 19, wherein the state probability comprises a probability distribution describing how the behavioral feature will occur.

22. The method of claim 1, wherein each behavioral feature prediction module generates a different behavioral feature prediction.

23. A system for controlling an autonomous vehicle based on predicted behavior of one or more actors on a road, the system comprising one or more processors and memory storing one or more programs for execution by the one or more processors, the one or more programs comprising instructions that, when executed by the one or more processors, cause the system to perform a method comprising:

receiving input data comprising sensor data from one or more sensors of the autonomous vehicle about one or more actors on a road;

generating, at an objective prediction module, an objective prediction based on the input data comprising a probability that a first actor will execute a driving operation;

providing the objective prediction to a motion planner;

identifying one or more behavioral features associated with the driving operation;

generating, at one or more behavioral feature prediction modules, one or more behavioral feature predictions corresponding to the one or more behavioral features;

providing the one or more behavioral feature predictions to a motion planner;

determining, by the motion planner, one or more responsive actions of the autonomous vehicle based on at least one of the objective prediction or the one or more behavioral feature predictions; and controlling, by a controller, motion of the autonomous vehicle based on the one or more responsive actions determined by the motion planner.

24. A non-transitory computer-readable storage medium storing instructions that, when executed by one or more processors of an electronic device, cause the device to:

receive input data comprising sensor data from one or more sensors of the autonomous vehicle about one or more actors on a road;

generate, at an objective prediction module, an objective prediction based on the input data comprising a probability that a first actor will execute a driving operation;

providing the objective prediction to a motion planner;

identify one or more behavioral features associated with the driving operation;

generate, at one or more behavioral feature prediction modules, one or more behavioral feature predictions corresponding to the one or more behavioral features;

provide the one or more behavioral feature predictions to a motion planner;

determine, by the motion planner, one or more responsive actions of the autonomous vehicle based on at least one of the objective prediction or the one or more behavioral feature predictions; and control, by a controller, motion of the autonomous vehicle based on the one or more responsive actions determined by the motion planner.

* * * * *